UNITED STATES PATENT OFFICE.

GEORGE THOMPSON WALKER, OF MINNEAPOLIS, MINNESOTA, ASSIGNOR TO COLONIAL CHEMICAL COMPANY, OF MINNEAPOLIS, MINNESOTA, A CORPORATION.

PROCESS OF CONCENTRATING LIQUIDS.

1,330,016.     Specification of Letters Patent.     Patented Feb. 3, 1920.

No Drawing. Application filed June 17, 1918, Serial No. 240,504. Renewed May 19, 1919. Serial No. 298,344.

*To all whom it may concern:*

Be it known that I, GEORGE T. WALKER, a citizen of the United States, resident of Minneapolis, county of Hennepin, State of Minnesota, have invented a certain new and useful Process of Concentrating Liquids, of which the following is a specification.

The object of this invention is to provide an improved process of concentrating a liquid without evaporation methods and with the use of a comparatively small amount of fuel.

The liquid, mixed with anhydrous sodium sulfate or other anhydrous salt which will form crystals containing water of crystallization is first warmed and stirred by the employment of any suitable apparatus. During this warming and stirring operation the temperature of the liquid is kept at the point necessary for the greatest solubility of sodium sulfate or other anhydrous salt used. The stirring operation is continued until the solution is thoroughly saturated with the anhydrous salt. The solution is then cooled as much as possible by any convenient means suitable for the purpose. During this cooling operation crystals of hydrated salt (Glauber salt where sodium sulfate is the anhydrous salt) form and the removal of these crystals concentrates the solution since they carry with them water of crystallization, for instance each pound of sodium sulfate so crystallizing will remove about one and one half pounds of water and thereby concentrate the solution to that extent. The process can be repeated if further concentration is desired.

By means of methods and processes already known the hydrated salt so obtained can be readily dehydrated and used again.

The process can be applied to any solution which does not react undesirably with sodium sulfate and where the presence of a small amount of sodium sulfate in the concentrated liquid would not be undesirable.

The process might be used for the concentration of liquids obtained by leaching ash from kelp or in concentrating brines from alkali lakes, these being only examples of the many different applications or adaptations of the process.

The process is also applicable in many cases where it is not allowed to heat a liquid to boiling, as would be necessary in ordinary evaporation methods. In this way solutions could be readily concentrated without heating above 100 degrees F. In certain cases the liquid might be saturated with sodium sulfate or other anhydrous salt at a lower temperature, say 60 or 75 degrees F., and by cooling to a still lower temperature concentration could be effected, even without heating the liquid above ordinary temperatures.

I claim as my invention:

1. A process for concentrating liquids which consists in mixing the liquid to be concentrated with a quantity of anhydrous sodium sulfate, heating the mixture to the temperature necessary for obtaining the greatest solubility of the sodium sulfate, stirring the mixture until the liquid is thoroughly saturated with the sodium sulfate, then cooling the solution, the crystals of Glauber salt formed during the cooling operation absorbing a considerable percentage of water from the solution and thereby affecting a concentration thereof.

2. A process for concentrating liquids which consists in mixing the liquid to be concentrated with anhydrous salt which will form crystals containing water of crystallization, heating the mixture to the temperature necessary for obtaining the greatest solubility of the salt, stirring the mixture until the mixture is thoroughly saturated with the anhydrous salt, then cooling the solution, the crystals of hydrated salt formed during the cooling operation absorbing a considerable percentage of water from the solution and thereby effecting a concentration thereof.

In witness whereof I have hereunto set my hand this 31st day of May, 1918.

GEORGE THOMPSON WALKER.